Feb. 6, 1945.  E. D. BOYCE  2,368,965
SHAPING MACHINE
Filed March 10, 1943  17 Sheets-Sheet 1

INVENTOR
Edward D. Boyce.
Martin J. Finnegan ATTORNEY

Feb. 6, 1945.   E. D. BOYCE   2,368,965
SHAPING MACHINE
Filed March 10, 1943   17 Sheets-Sheet 4

INVENTOR
Edward D. Boyce
BY Martin J. Finnegan
ATTORNEY

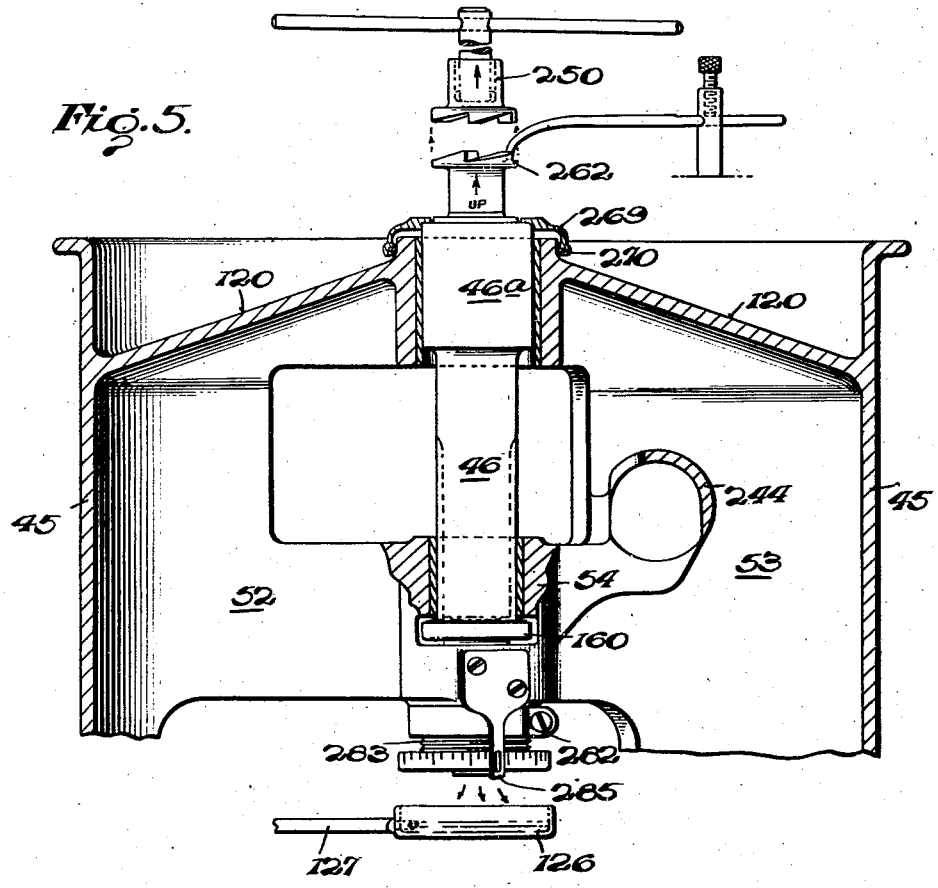
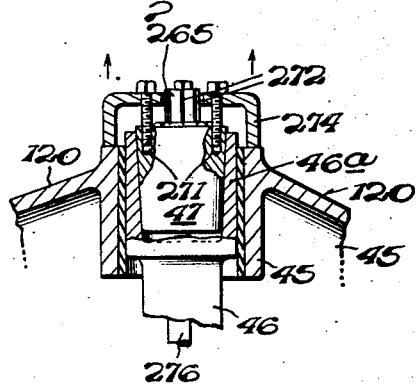
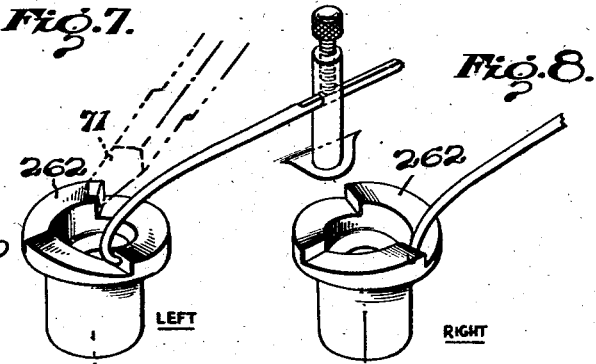

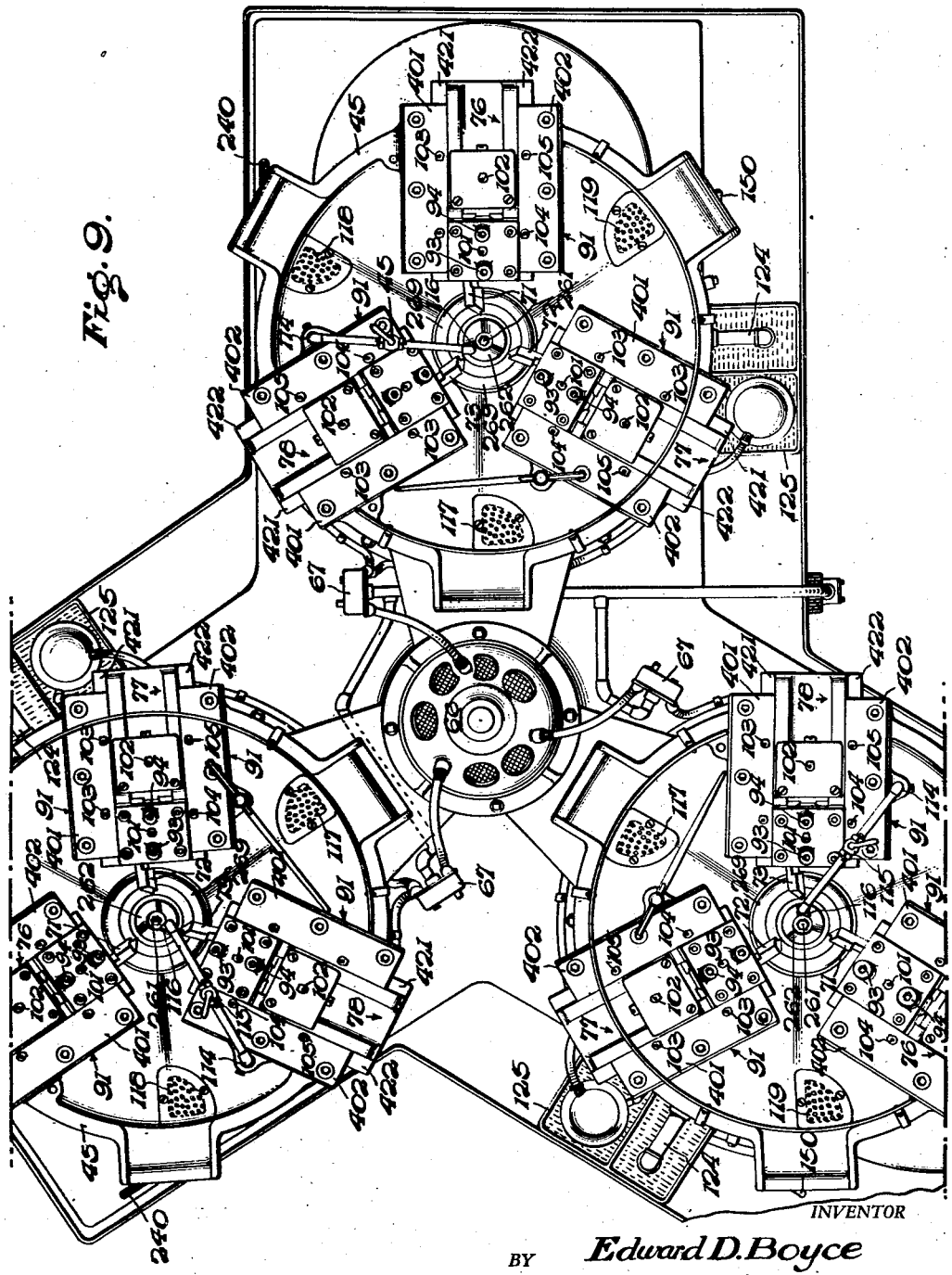

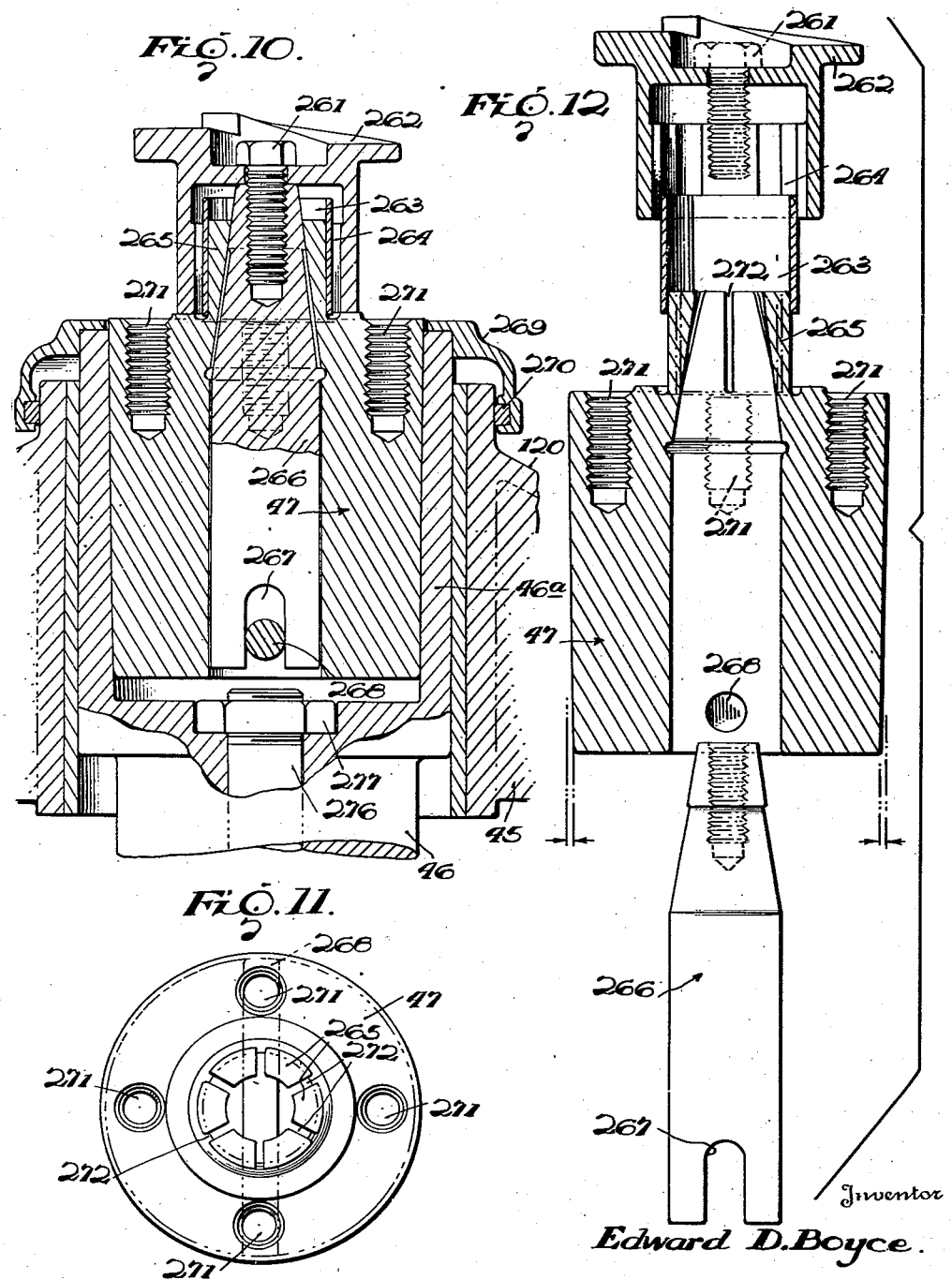

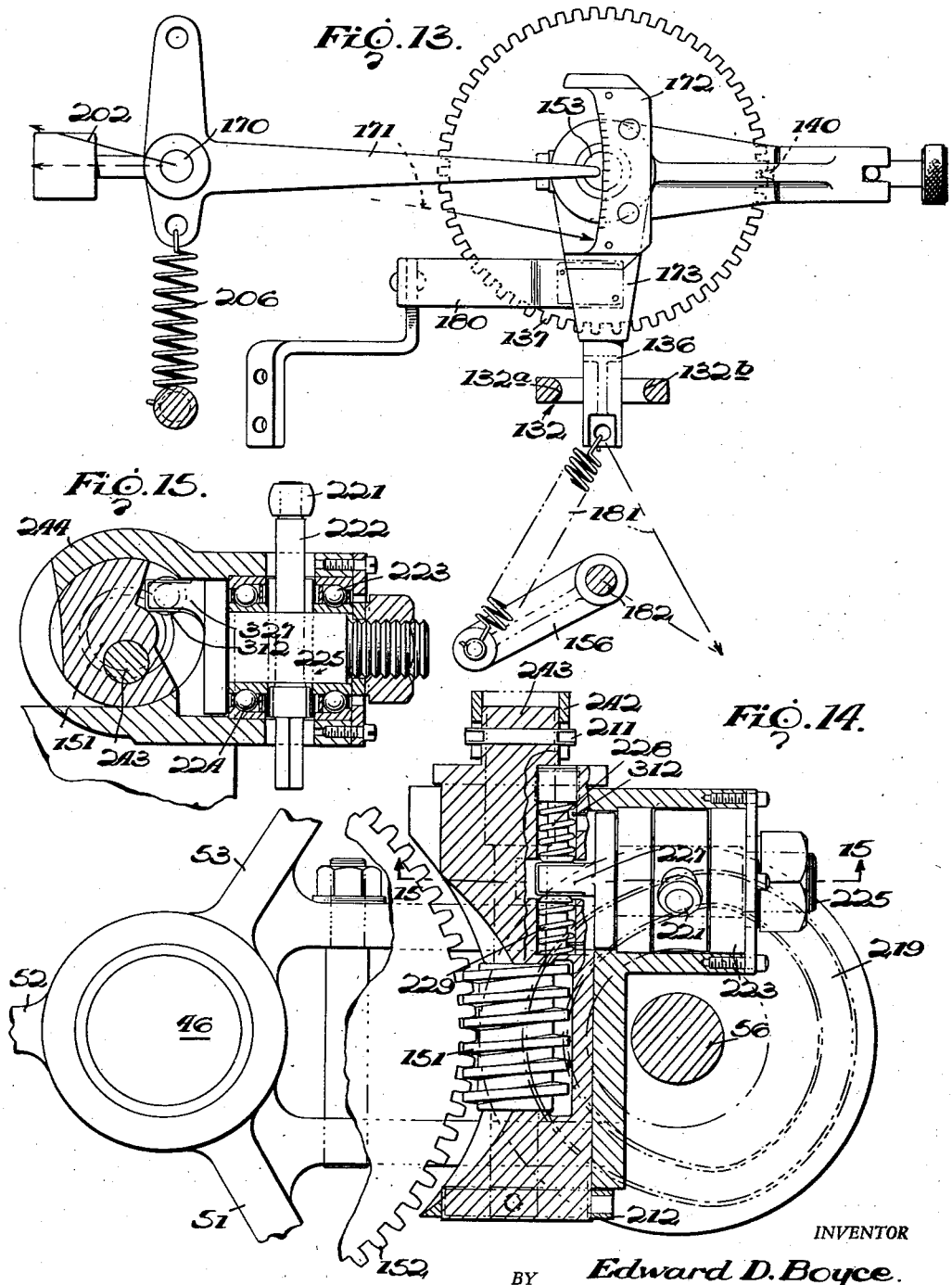

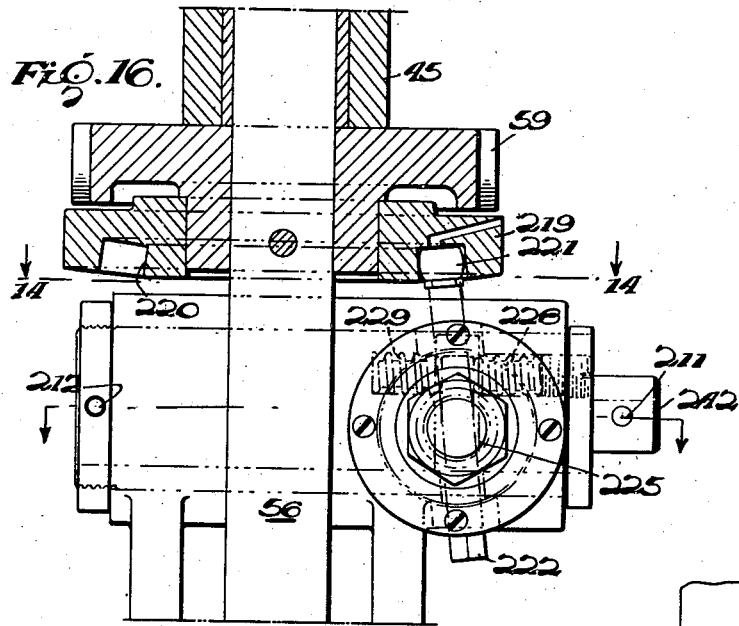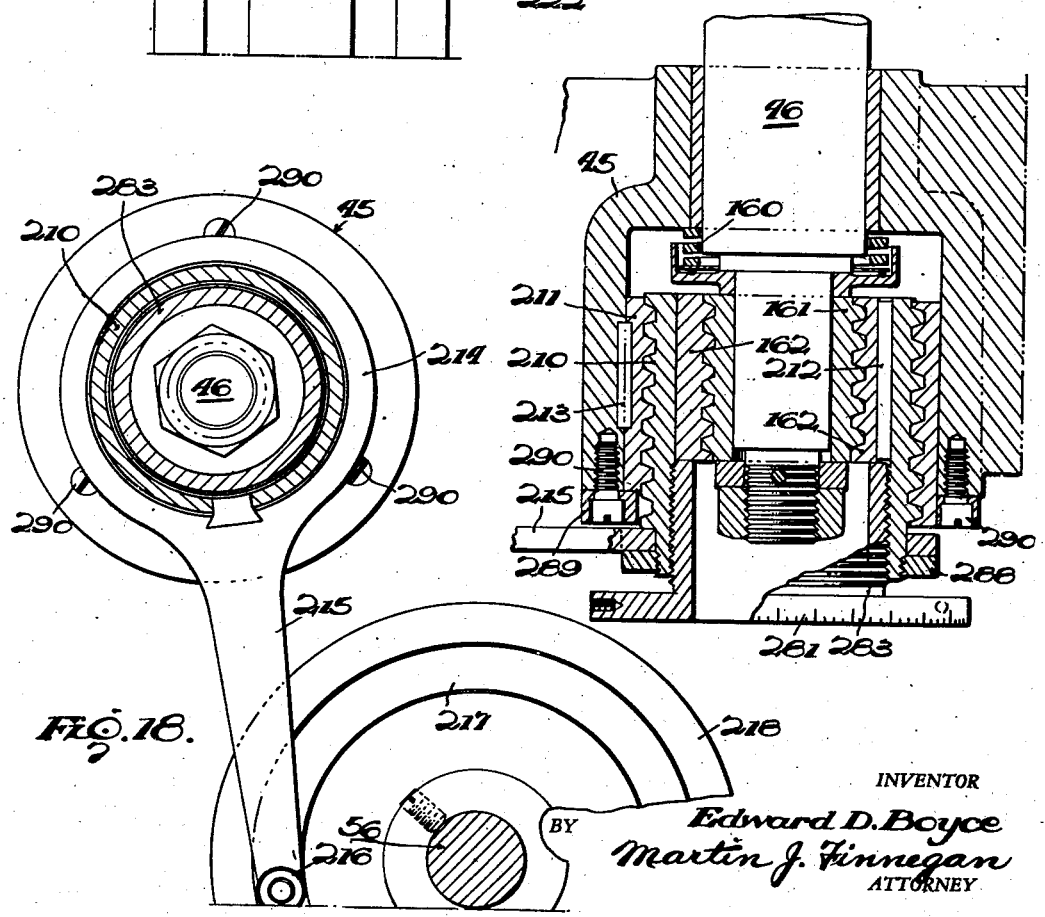

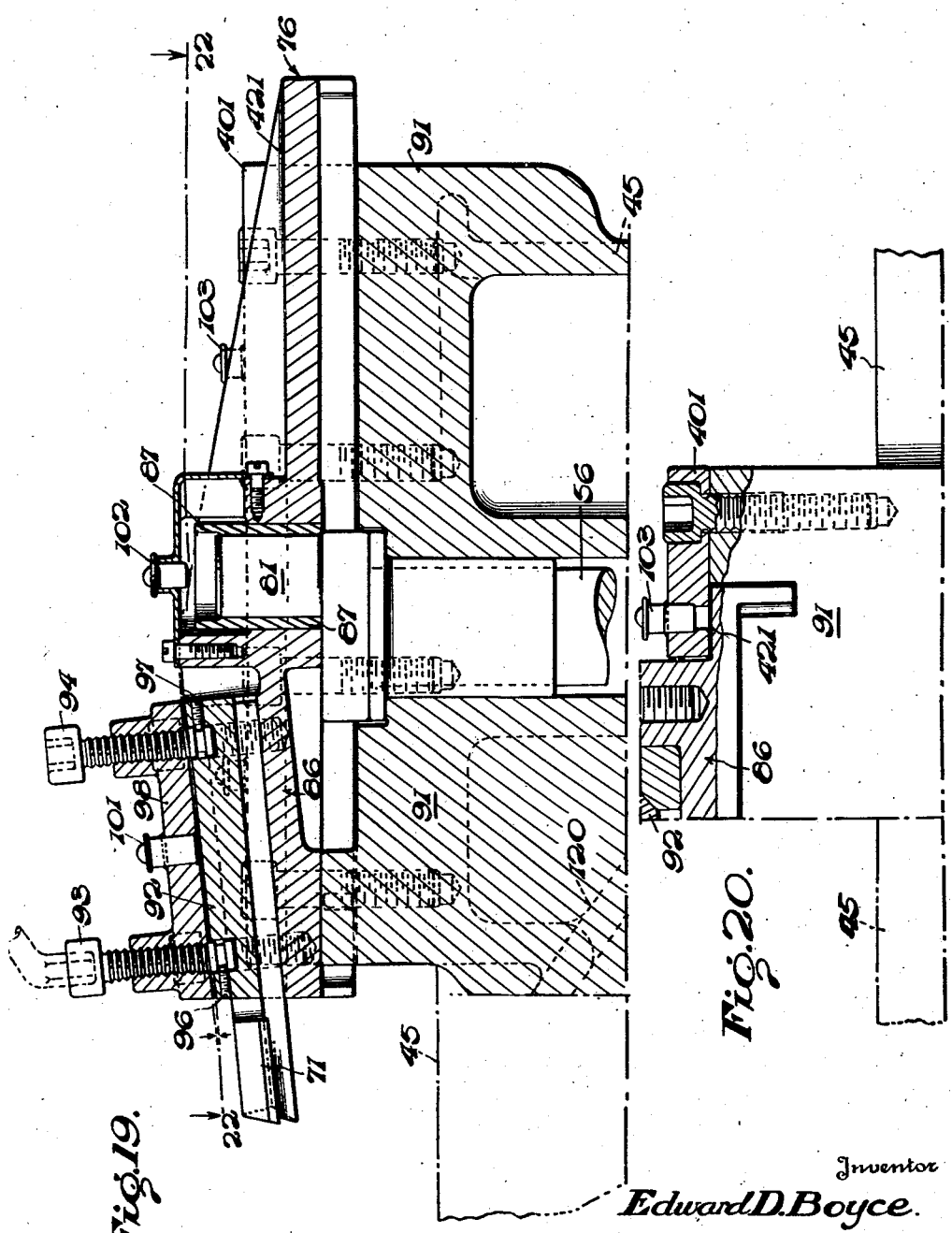

INVENTOR
Edward D. Boyce
BY Martin J. Finnegan ATTORNEY

Feb. 6, 1945.　　　　E. D. BOYCE　　　　2,368,965
SHAPING MACHINE
Filed March 10, 1943　　　17 Sheets-Sheet 12
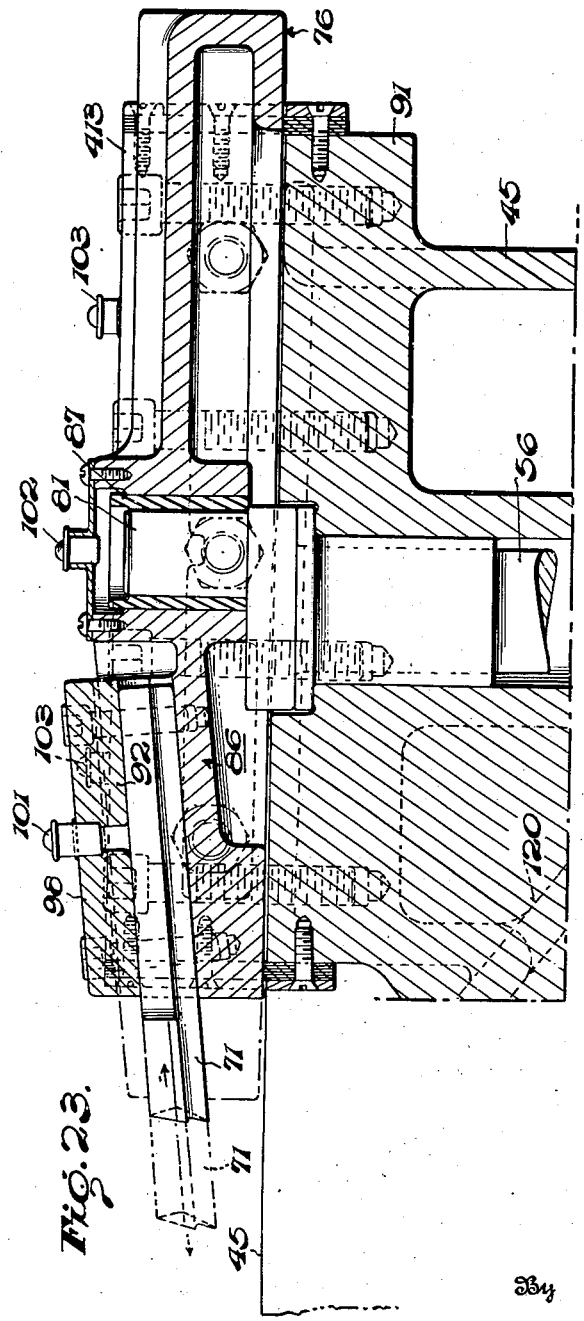
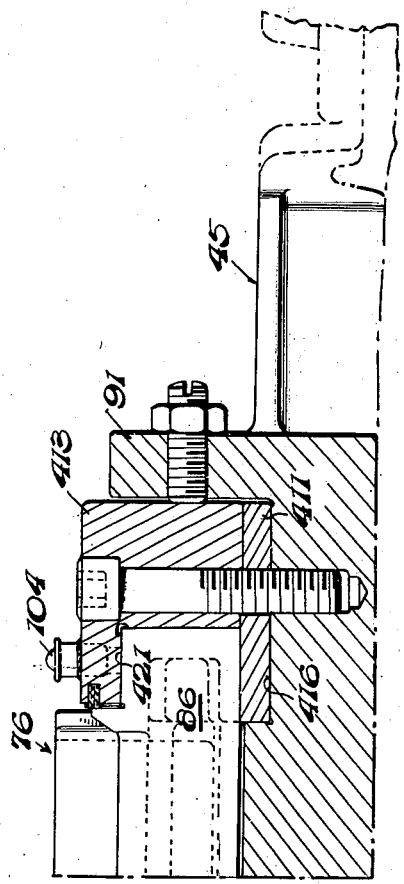
Inventor
*Edward D. Boyce*
By *Martin J. Finnegan*
Attorney Feb. 6, 1945.   E. D. BOYCE   2,368,965
SHAPING MACHINE
Filed March 10, 1943   17 Sheets-Sheet 13
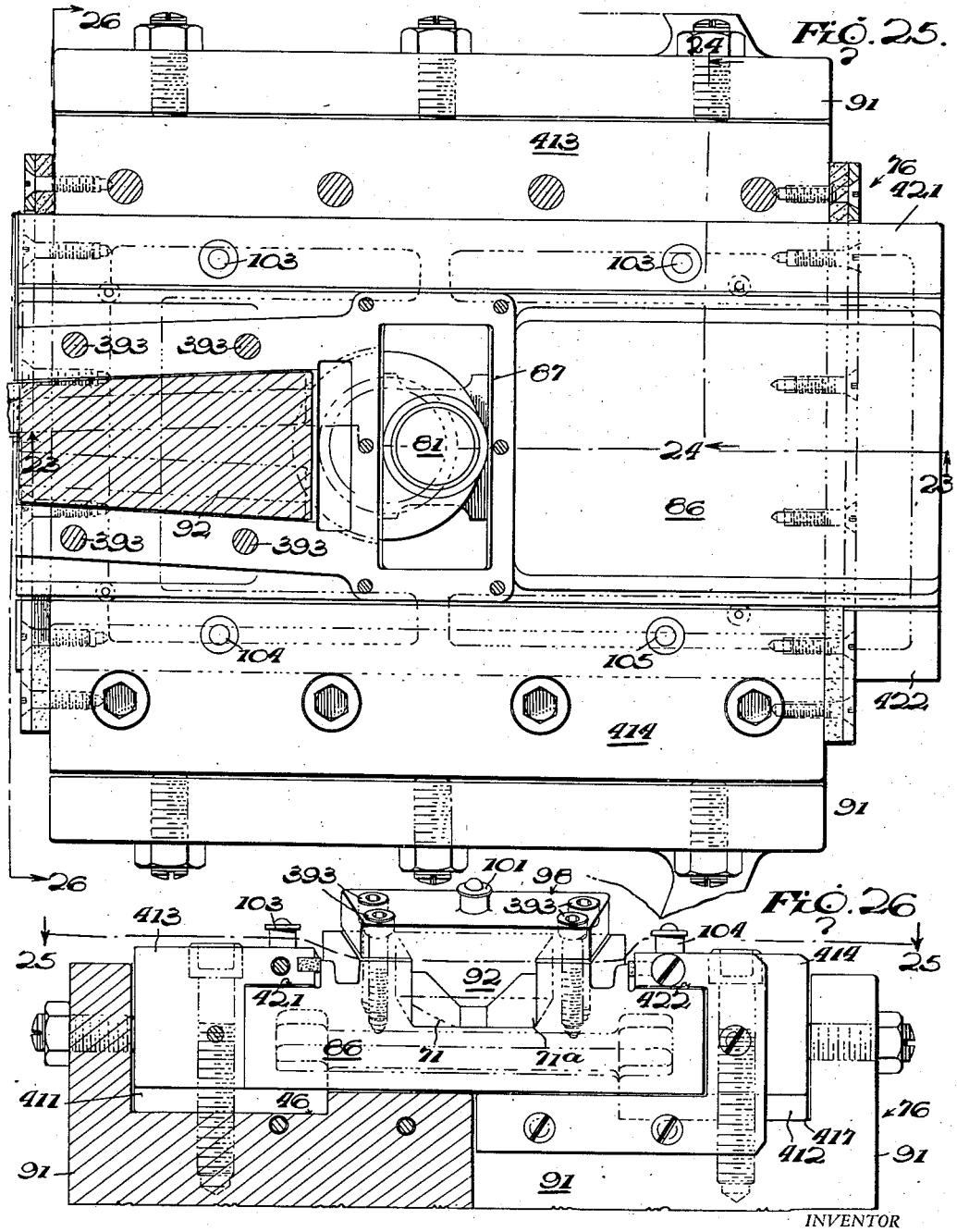
INVENTOR
Edward D. Boyce
BY
Martin J. Finnegan
ATTORNEY Feb. 6, 1945.  E. D. BOYCE  2,368,965
SHAPING MACHINE
Filed March 10, 1943  17 Sheets—Sheet 14

INVENTOR
Edward D. Boyce
By
Martin J. Finnegan ATTORNEY

Feb. 6, 1945. E. D. BOYCE 2,368,965
SHAPING MACHINE
Filed March 10, 1943 17 Sheets-Sheet 15
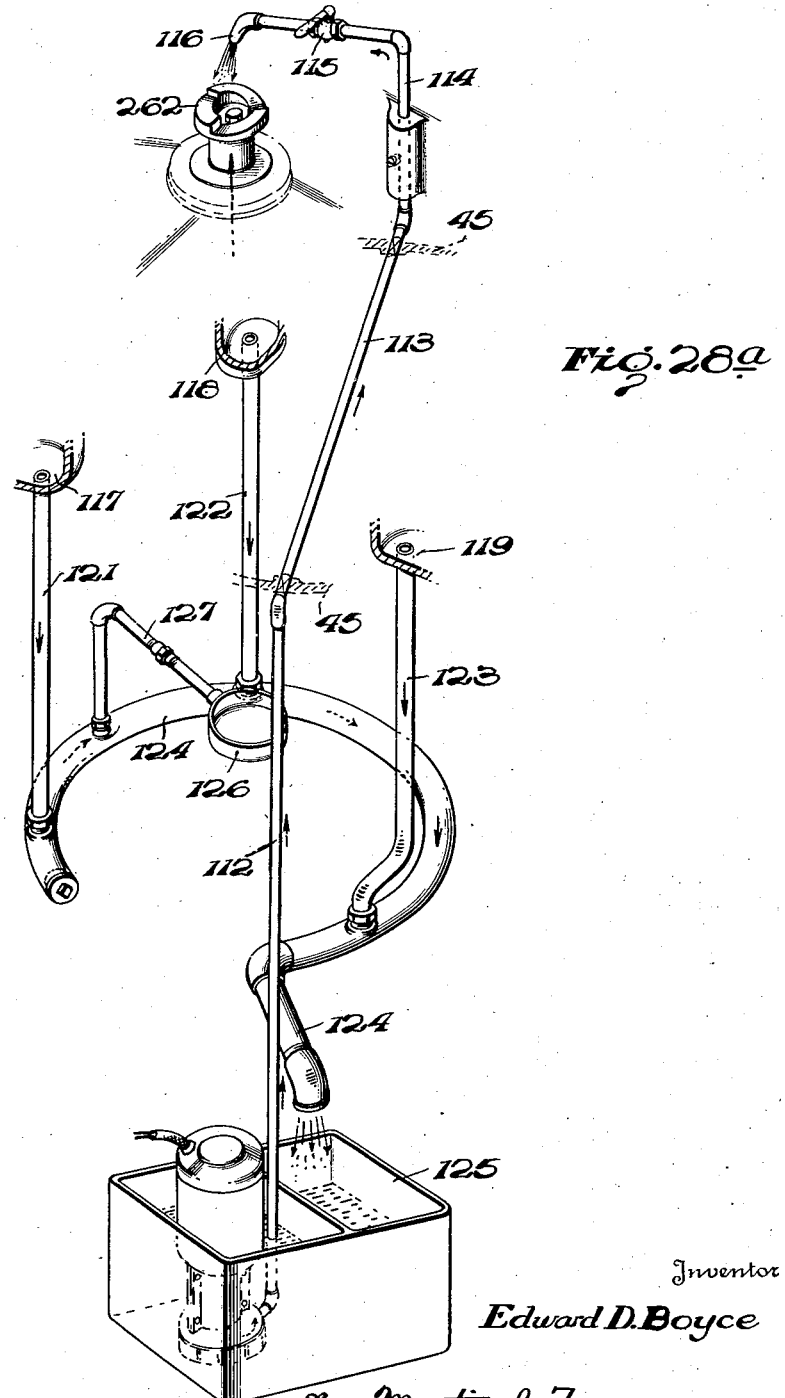
Fig. 28ᵃ
Inventor
Edward D. Boyce
By Martin J. Finnegan
Attorney Feb. 6, 1945.  E. D. BOYCE  2,368,965
SHAPING MACHINE
Filed March 10, 1943  17 Sheets-Sheet 16

Inventor
Edward D. Boyce
By Martin J. Finnegan
Attorney

Inventor
Edward D. Boyce
By Martin J. Finnegan
Attorney

Patented Feb. 6, 1945

2,368,965

UNITED STATES PATENT OFFICE 2,368,965

SHAPING MACHINE

Edward D. Boyce, Little Falls, N. J., assignor to Bendix Aviation Corporation, Bendix, N. J., a corporation of Delaware Application March 10, 1943, Serial No. 478,724

4 Claims. (Cl. 90—32)

This invention relates to machine tools, and particularly to a machine for shaping clutch teeth of the type provided on engine-engaging members of starting mechanisms for imparting initial rotary movement to high power internal combustion engines.

Such teeth, as shown in Patent No. 1,962,397, granted to Raymond P. Lansing on June 12, 1934, are adapted to move into mesh with correspondingly shaped teeth on a similar member that is drivably associated with the crankshaft of the engine to be started. Torque is transmitted from the driving "jaw" to the driven "jaw" by way of the shorter sides of the several teeth, while the longer sides of the teeth act as cams to disengage one "jaw" from the other when the speed of the driven jaw has increased sufficiently (due to power developed by fuel combustion in the engine being started) to cause "overrunning" of the driving (starter-mounted) jaw.

These longer sides of the jaw teeth must be of precisely machined and uniform pitch, or slope, to assure proper disengagement, as well as to assure full and precise registry of the shorter "cranking" faces of the teeth. With the methods heretofore employed for shaping the teeth, it has been difficult to assure such precision, and difficult to assure the desired uniformity as between one unit and another; uniformity being further desirable because of the possibility that replacement of one or the other of the units may be necessary, from time to time, in service.

The present invention provides a novel method and novel machinery for shaping teeth of the character referred to; and the provision of such novel method and machinery therefore constitute objects of the invention.

These and other objects of the invention will become apparent from inspection of the following specification when read with reference to the accompanying drawings wherein is illustrated the preferred embodiment of the invention. It is to be expressly understood, however, that the drawings are for the purpose of illustration only, and are not designed as a definition of the limits of the invention, reference being had to the appended claims for this purpose.

In the drawings:

Fig. 5 is a view along line 5—5 of Fig. 1;

Fig. 6 is a view of the work-holding chuck, showing also a tool employed for withdrawing the chuck when inspection or replacement thereof is required;

Figs. 7 and 8 are views of left and right-hand jaws (for left and right-hand "cranking," respectively) showing also the application of gauge tools thereto for assuring proper positioning of the jaw in the work-holding chuck, prior to commencement of the shaping operation;

Fig. 9 is a plan view showing three machines spaced equally about a common driving motor;

Fig. 10 is another view, on a larger scale than Fig. 6, of the work-holding assembly, with the "work" (jaw) in place thereon;

Fig. 11 is top plan view of the work-holder of Fig. 10 with the "work" removed;

Fig. 12 is an "exploded" view of the assembly shown in Fig. 10;

Fig. 13 is a view of the spindle indexing control, which determines the amount and timing of the rotation of the worm and gear combination which operates the work rotating and work lifting means by which the jaw being shaped is rotated and raised the predetermined amount after each cut of the shaping cutters (the shaping cutters being three in number for the three-toothed jaw shown);

Figs. 14 to 18 show an alternative spindle control mechanism. This alternative control mechanism is employed when it is desired to have full relief of the cutting tools on the back (non-cutting) strokes.

Fig. 15 is a view along line 15—15 of Fig. 14;

Fig. 16 shows the actuating cam for the spindle control mechanism of Figs. 14 and 15;

Fig. 17 shows the screw assembly actuated by the control mechanism of Figs. 14–16;

Fig. 18 shows the cam and lever assembly which actuates the outer screw combination of Fig. 17;

Fig. 19 is a view of one of the shaping cutters and supporting and operating means therefor;

Fig. 20 is a view along line 20—20 of Fig. 22;

Figs. 23 to 26 show a modified form of supporting and operating means for a shaping cutter;

Figure 27:
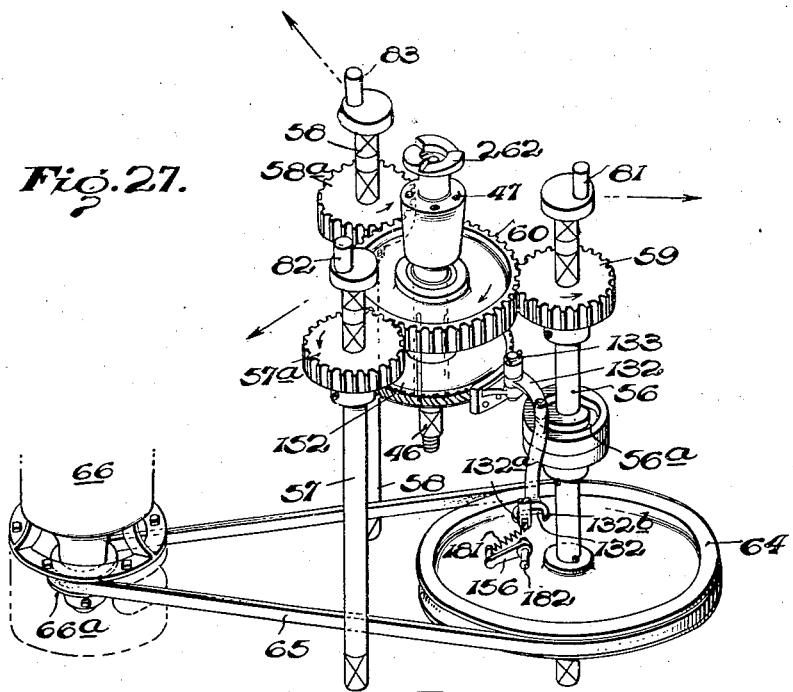
Figure 28:
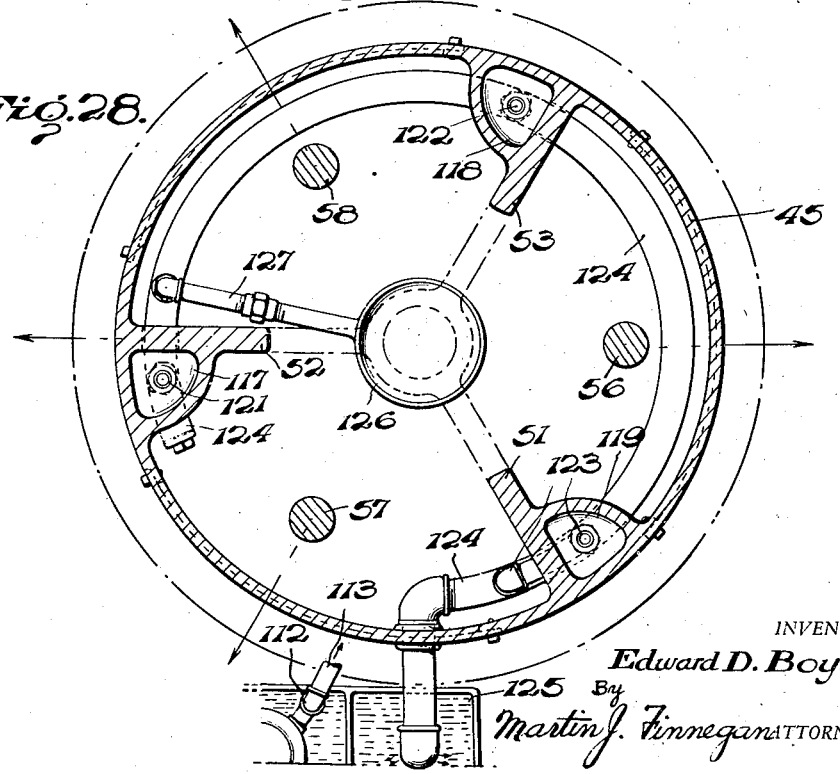
Figure 29:
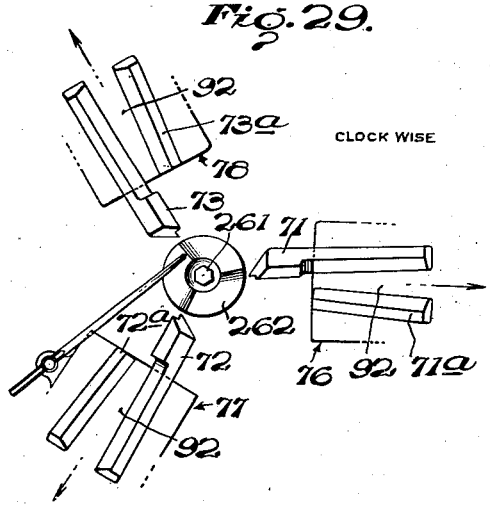
Figure 30:
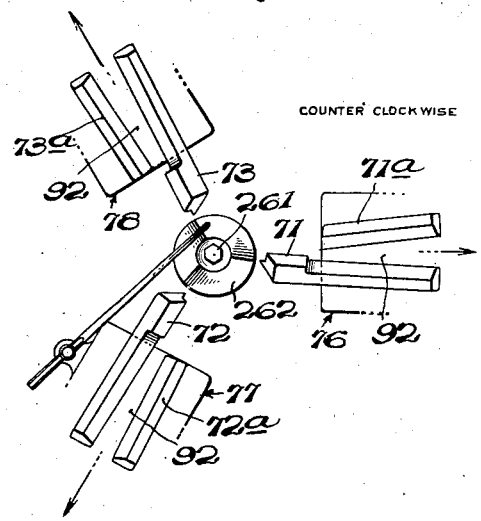
Figures 31, 33:
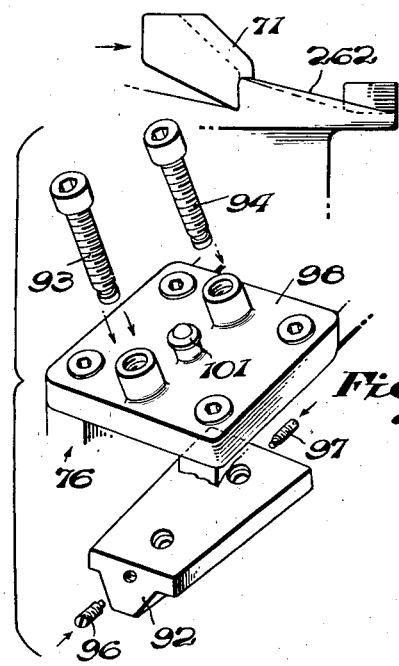
Figures 32, 34:
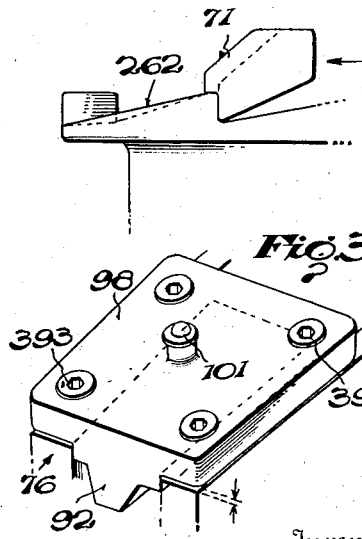
Figure 35:
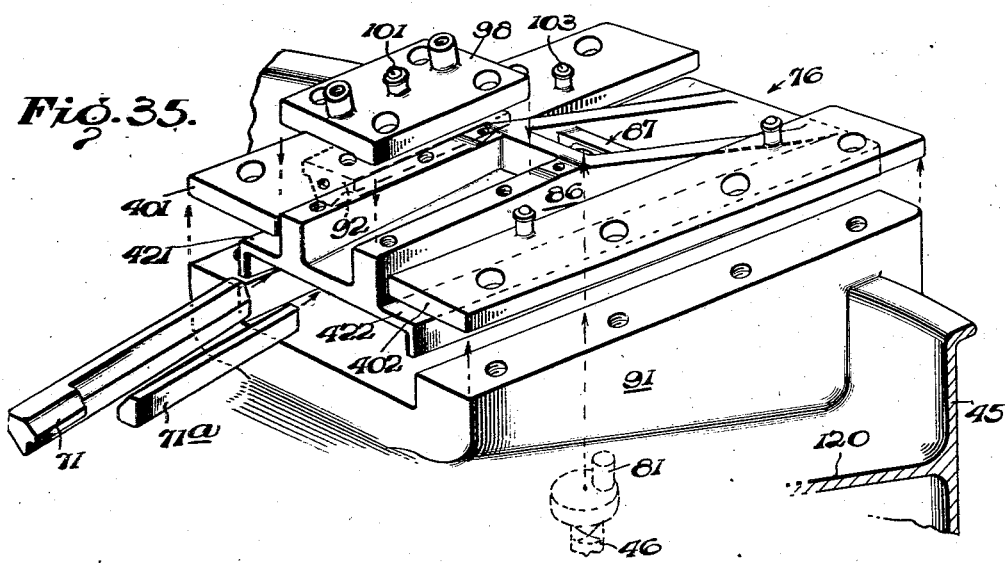

Figs. 24 and 25 being sectional views on lines 24—24 and 25—25 of Figs. 25 and 26, respectively;

Fig. 27 is a perspective view of the driving means for all three cutters;

Fig. 28 is a transverse view of the supporting frame of the machine, and showing also a portion of the oiling system;

Fig. 28a is a complete diagram of the oiling system;

Figs. 29 and 30 show the relationships of cutters to the work at the commencement of cutting for left and right-hand jaws, respectively;

Figs. 31 and 32 show the said relationships as they appear at the conclusion of the cutting for left and right-hand jaws, respectively;

Fig. 33 is an exploded view of the cutter holding means;

Fig. 34 shows a modified form of cutter holder;

Fig. 35 is an exploded perspective view of the assembly of Figs. 19 to 22; and

Figure 36:
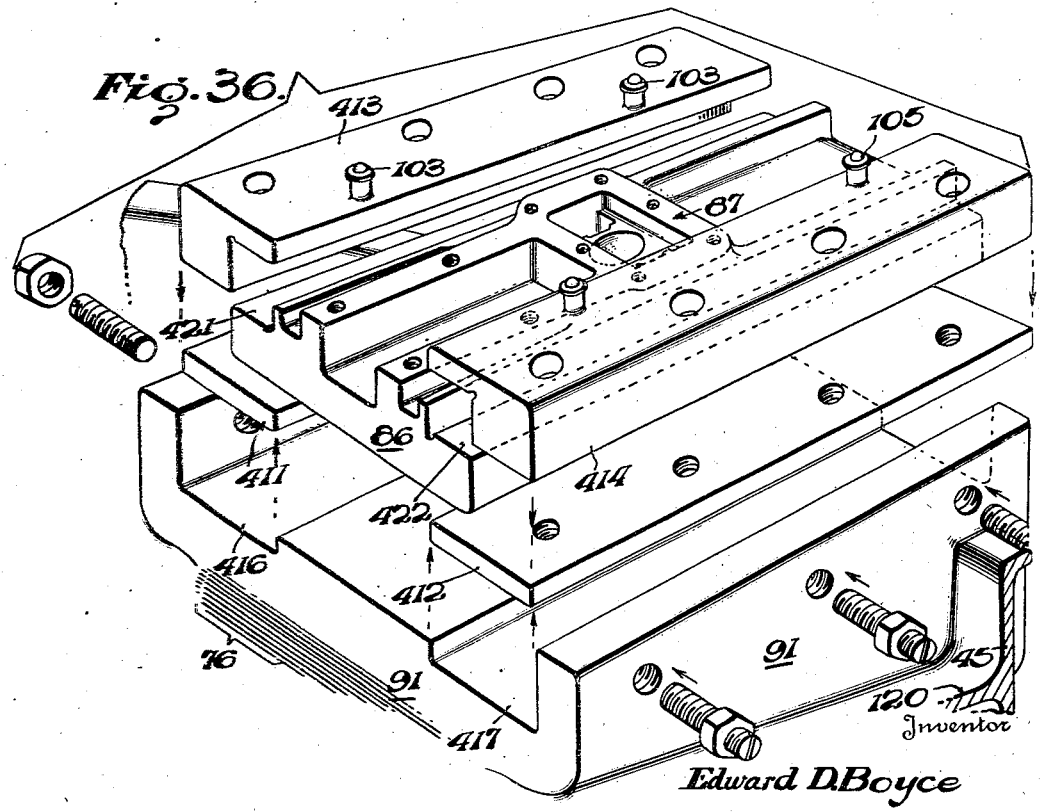

Fig. 36 is an exploded perspective view of the assembly of Figs. 23 to 26.

Referring first to Figs. 1 to 4, the machine shown therein as embodying the invention includes a substantially cylindrical frame 45; a spindle 46 disposed along the vertical axis of the frame 45; a work-holding fixture 47 having a taper fit in the socketed upper end of spindle 46; three radial ribs 51, 52, 53, extending from the cylindrical frame to the central bearing 54 which receives the spindle 46; three vertical shafts 56, 57, 58, the shaft 56 being the driving means for the other two; spur gears 59 and 60 (Fig. 27) drivably connecting shaft 56 to shafts 57 and 58 with the aid of two additional spur gears 57a and 58a (Fig. 27) keyed to shafts 57 and 58, respectively; a pulley 64 keyed to main drive shaft 56; a belt 65 to drive the pulley 64; a driving motor 66 to drive pulley 66a and belt 65; a starting switch 67 for the motor 66; an automatic stop switch 68 (Fig. 4); three reciprocable shaping cutters 71, 72, 73; and three cutter reciprocating assemblies 76, 77 and 78 for the cutters 71, 72 and 73, respectively.

Each cutter reciprocating assembly is actuated by one of the vertical shafts 56, 57 and 58. The reciprocation is effected by the provision of eccentrically disposed pins 81, 82, 83 (see Fig. 27) on the top surfaces of the head portions of the shafts 56, 57, 58, respectively, and each eccentric pin fits into and actuates a hollow block portion 87 of a cross-head corresponding to the cross-head 86 of Figs. 19–22.

As shown in these Figs. 19 to 22, the cross-head 86 reciprocates along a bed plate 91 which is an integral part of the main casting 45 of the machine, the reciprocation resulting from the engagement of the rotating eccentric pin 81 with the rectilinear surfaces of the hollow block portion 87 of the cross-head 86. As the cross-head reciprocates, it carries with it the shaping cutter 71 which is held therein by the provision of a wedging piece 92, as shown best in Figs. 19 and 21. A pair of screws 93, 94, together with a pair of set screws 96, 97 (see Fig. 19) cooperate to hold the clamping cover plate 98 in such relation to the wedging piece 92 as to prevent relative movement between the cutter 71 and the reciprocating cross-head 86 during operation of the machine.

The several surfaces of the reciprocating assembly and of the supporting bed plate 91 are lubricated by oil flowing thereto from the oil receiving cups 101, 102, 103, 104 and 105, each of which has a dust cover of the spring-pressed ball type as shown. Lubrication is supplied to the jaw unit being worked upon by the oil feeding circuit shown in Fig. 28a, the said circuit including an electrically driven oil pump 111, feed lines 112, 113, 114, a manual control valve 115, a spout 116, catch basins 117, 118 and 119, located at angularly spaced intervals about the circular tray (constituted by the upper surface 120 of the machine), and return conduits 121, 122 and 123 leading to the common return manifold 124 which empties into the reservoir 125 from which the lubricant is again picked up by the pump 111. An oil tray 126 is disposed directly under the spindle 46, and feeds back to the reservoir by way of pipe 127.

Figure 1:
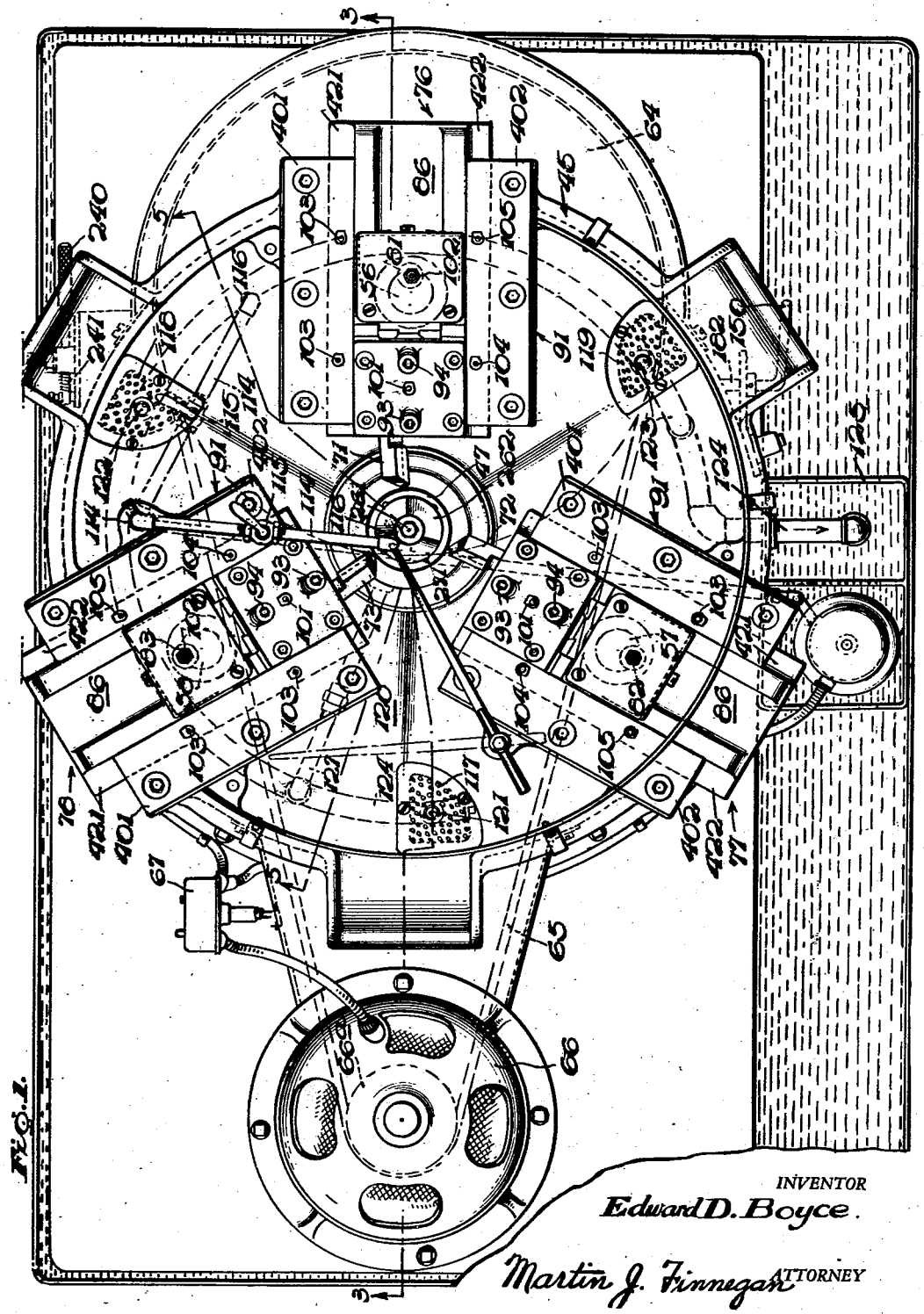
Figs. 1 and 2 are plan and side elevation views of a machine embodying the invention.
Figure 2:
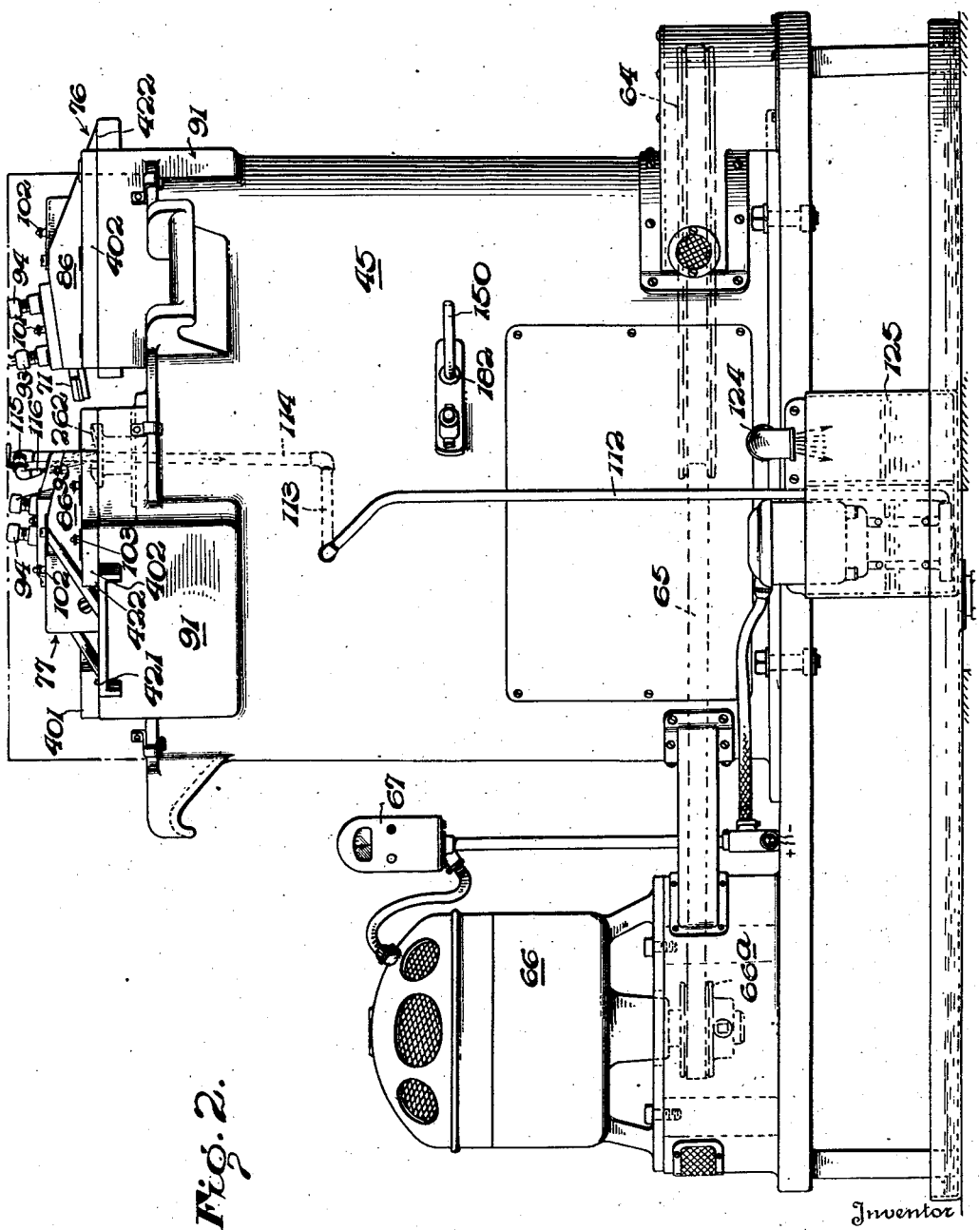
Figure 3:
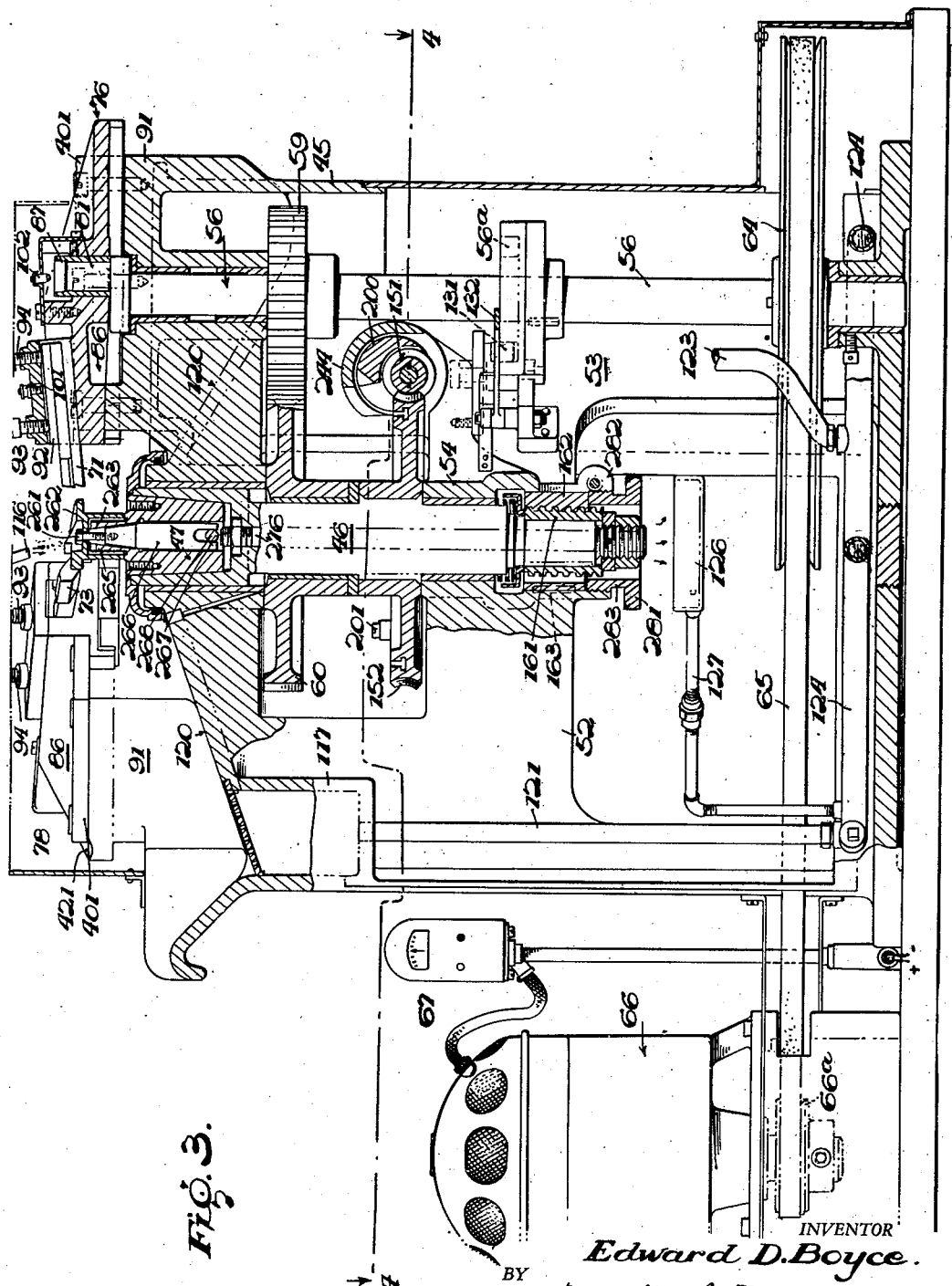
Fig. 3 is a view along line 3—3 of Fig. 1.
Figure 4:
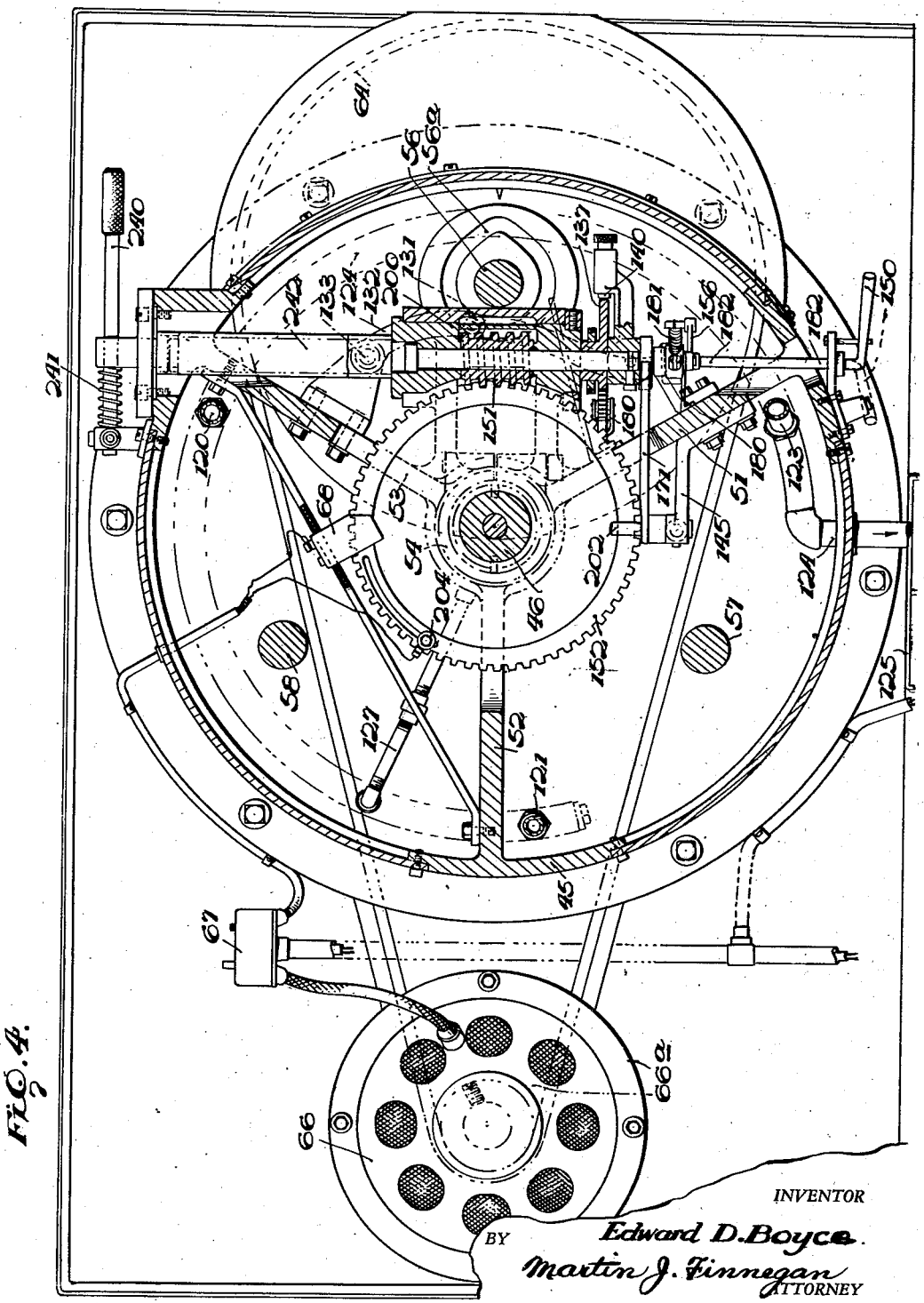
Fig. 4 is a view along line 4—4 of Fig. 3.
Figure 21:
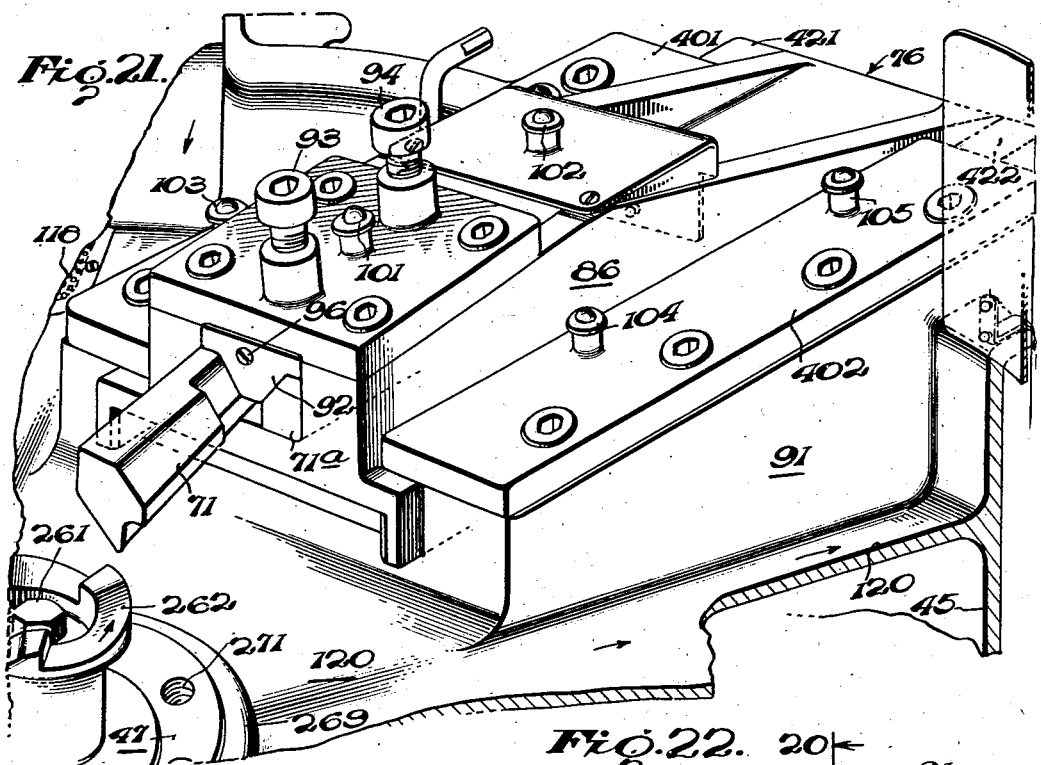
Fig. 21 is a perspective view of the assembly of Fig. 19.
Figure 22:
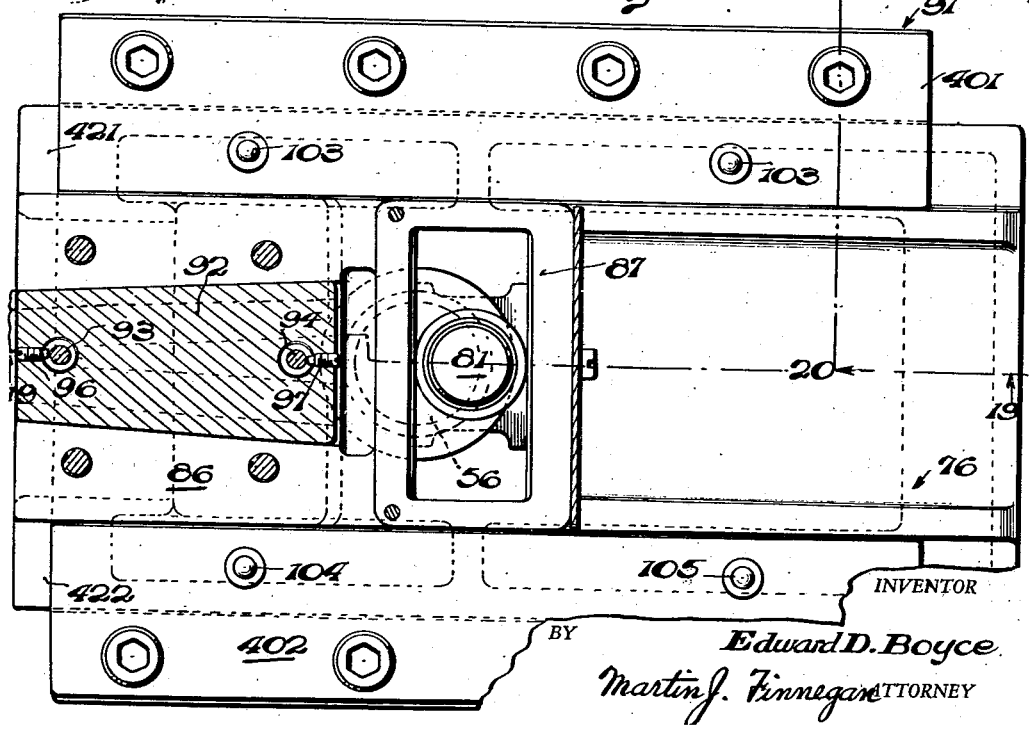
Fig. 22 is a transverse view along line 22—22, of Fig. 19.

The drive from the main drive shaft 56 to the indexing screw mechanism which controls the turning and lifting of the work, during each interval of withdrawal and return of the shaping cutters into cutting relationship, will now be described. As shown in Figs. 3, 4 and 13, this drive includes a circular plate 56a in which there is cut a non-circular groove adapted to receive a following roller 131 located at the extremity of a bifurcated lever 132 (see Fig. 13) which is pivotally mounted in a bracket attached to rib 51 (see pivot 133, Fig. 4) and therefore undergoes a rocking movement in response to the rotation of the cam 56a to which the follower 131 responds.

This rocking movement causes first one and then the other of the two side portions 132a and 132b of the lever 132 to engage and move the frame 173 carrying the pawl 136, and thereby to produce intermittent rotation of the ratchet wheel 137 with which the tooth of the pawl 136 engages; the formation of the cam groove in the member 56a being such that the rocking action (and hence the indexing of the ratchet wheel 137) occurs during that portion of the revolution of the shaft 56 which corresponds to that portion of the cycle of reciprocation of the cutter during which the said cutter is out of contact with the work unit that is being shaped.

This indexing of the ratchet wheel 137 is communicated to the spindle 46 by virtue of the worm and worm gear connections shown at 151 and 152 in Figs. 3 and 4—the ratchet wheel 137 being suitably secured to the shaft 153 of which the worm 151 constitutes an integral part. As the worm gear 152 is thus turned about its axis by the recurring impulses imparted to the ratchet wheel 137 by the cam actuated yoke 132 acting upon the pawl 136, the spindle 46 is correspondingly turned intermittently about its axis, due to the splined connection between the hub of the worm gear 152 and the spindle 46.

As this turning of the spindle 46 occurs, the spindle is at the same time lifted by the screw action of the engaging screw and nut elements 161 and 162 (see Fig. 3), the former being keyed to the lower portion of the spindle 46 and the latter rigidly secured (as by key 163, Fig. 3) to the stationary bearing structure 54 constituting an integral part of the main casting of the machine; the amount of lifting of the screw (against the opposing of spring 160), upon each intermittent rotary movement of the spindle, being only just enough to maintain the predetermined desired slope of the surfaces that are being worked upon by the three cutters 71, 72 and 73.

In order to control the ratcheting action of the pawl 136 upon the ratchet wheel 137, so that the degree of turning of the ratchet wheel will be gradually reduced and finally stopped, as the cutting operation approaches and finally reaches completion, there is provided (see Fig. 13) a control mechanism including a tapering finger 171 whose extremity is adapted to be brought into frictional engagement with the arcuate surface of a member 172 which is an integral extension of the frame 173 which carries the pawl 136; the tapering finger 171 being normally held in the central position indicated in Fig. 13 (in which position it is out of contact with the arcuate surface of member 172) but adapted to be swung from this neutral position to a position above or below the position shown, depending upon the direction of rotation of the driving shaft 56—it being understood that the spindle 46 rotates in one direction when the work being operated upon by the cutters is of the type in which the teeth have a right-hand pitch, and in the opposite direction when the work involves teeth of a left-hand pitch.

The swing of the finger 171 (about its fixed pivot 170, secured to bracket 145, Fig. 4) from the central to the side position (one of which side positions is shown in dash lines in Fig. 13) is brought about by placing upon the rim of the worm gear 152 a cylindrical striker element 204 (Fig. 4) which will engage and move the projecting block 202 of the finger assembly (see Fig. 13) when the worm gear approaches the limit of the 120 degree arc of rotation which signifies the approach to the point of completion of the cutting operation upon the work being operated upon—the adjustable position of the striker 204 in relation to the location of the block 202 being such that the engagement of 204 with 202 will occur as just indicated. As engagement occurs, the centering spring 206 (Fig. 13) of course yieldably opposes the swinging of the finger 171, and upon completion of the cutting operation and the subsequent return rotation of the worm gear 152 to its initial position, the spring 206 will operate to re-center the finger 171.

During the period of inter-engagement of the parts 204 and 202, the finger 171 is gradually moved toward its extreme side position and therefore gradually reduces the successive rotational impulses of the ratchet wheel 137, so that the arc of rotation is first reduced from, say, an arc of length corresponding to the distance along four teeth of the ratchet wheel to an arc of three-tooth length, then an arc of two-tooth length, then an arc of only one-tooth length, and finally the restraining effect of the finger 171 upon the member 172 becomes so great that the pawl 136 cannot move sufficiently far to produce any change whatever in the position of the ratchet wheel 137. This result (which means that the spindle 46 and hence the work maintained thereon can no longer be rotated or lifted) will occur just as the total number of strokes necessary for the completion of the cutting operation has been accomplished.

It will be understood that the restraining effect of the finger 171 upon the member 172 is gradually increased in the manner just recited because of the fact that the radius of curvature of said arm is different from the radius of curvature of the surface of the member 172 with which said finger engages, and therefore there is a gradual increase in the degree of opposition to the swinging of the pawl-frame 173 (which is guided by its sliding contact with friction brake 180, and spring-loaded, as indicated at 181). The swinging of the frame is, of course, induced by the engagement of said frame by one side or the other of cam actuated lever 132, as heretofore recited.

The spring 181 may be shifted to the opposite position (indicated by the dash line in Fig. 13) by a turning of crank 150 (Fig. 4) on the end of shaft 182 carrying spring arm 156. This shifting would be desired in order to reverse the direction of ratcheting action, and hence the direction of indexing of the work, as in shaping jaws of opposite "hand."

A manually releasable detent 140 may be provided for the ratchet wheel 137, as shown in Fig. 13. This detent includes a laterally projecting pin for cooperation with the supporting bracket to hold the detent disengaged from the wheel 137, when the machine is in use.

In the embodiment thus far described, the operation of the indexing means is such that the work remains stationary not only during that portion of each cutter's stroke in which the actual cutting is occurring, but also during the first portion of each cutter's return stroke, and in fact until the radially moving cutters have traveled back far enough to clear the outer periphery of the work. Because of this fact it will be seen that the cutting edge of each cutter remains in actual dragging contact during this portion of each back-stroke, with the surface of the work being cut.

In other words, in this embodiment of the invention, there is no "relief" of the cutters, with respect to the work, as the cutters move back for their next cutting strokes.

Turning now to Figs. 14 to 18, there is disclosed therein an assembly of parts which cooperate to produce such "relief" by imparting to the work a combined rotary and axial motion which is the reverse of the indexing motion; this "reverse indexing," as it may be termed, or withdrawing of the work, being effected during the brief final portion of the inward, or cutting, strokes of the cutters—that is, that portion of the stroke of each cutter which constitutes the over-travel, so to speak, of the said cutter, plus the immediately following initial portion of the return stroke. The cooperating parts to accomplish this "full relief" effect include two additional screw elements 210 and 211 (Fig. 17) enveloping the screw elements 161 and 162, the elements 162 and 210 being keyed together, as shown at 212, and the element 211 being keyed to the housing bearing structure 45, as shown at 213.

Screw 210 receives the annular end 214 of a lever 215 whose opposite end receives a roller 216 movable in the cam-track 217 of an additional circular cam-plate 218 which can be carried on the drive shaft 56 (at a place below cam-plate 56a); the relationship of the roller 216 to the cam-track 217 being such as to produce a reverse screw action upon the spindle 46 during the initial stage of the cutter back-stroke.

In order to avoid a locking effect as between worm 151 and worm wheel 152 during this reverse screw action, there is provided a cam actuated mechanism (Figs. 14, 15, 16) operating to axially shift the said worm 151 to an extent corresponding to the amount of the reverse rotation of spindle 46 and worm wheel 152, splined thereto. Said cam mechanism includes a cam-plate 219 (Fig. 16) having a cam-track 220 receiving a roller 221 mounted on the end of a rockable lever 222 journaled in bearing assemblies 223 and 224 (Fig. 15).

Rocking of lever 222 in said bearings (which allow the necessary play) causes arm 227 of spindle 225 to exert compressing pressure on either spring 228 or 229 to cause worm 151 to shift axially in synchronism with the reverse rotation of worm wheel 152; the said axial shifting being just enough to allow the necessary reverse rotation of the worm wheel 152.

After a piece of work has been completely shaped, and the machine is stopped (either by automatic opening of the motor circuit or by manual opening thereof) the attendant will remove the work-piece from the holder 47 (as by removing the screw 261, Fig. 10) and will then cause worm 151 to be disengaged from worm wheel 152. This is done by swinging handle 240 (after first withdrawing it from its spring-restrained detent 241) thereby rotating sleeve 242 and thus causing the eccentric 153 to swing the worm 151 about the eccentric bearing shell 244; thus disengaging it from wheel 152.

The worm wheel 152 being thus relieved of the locking influence of the worm 151, the attendant may now screw down the spindle 46 to its original (lowest) position (as by use of a special restoring tool 250, Fig. 5) and thus place the machine in readiness for re-use upon a new piece of work—the finished piece of work being, of course, first removed. When the original position is reached, in response to use of tool 250, a limit stop prevents further movement.

To remove the finished piece, the attendant applies a socket wrench to the head of screw 261 (Fig. 10) and withdraws said screw, thus removing the work-piece 262. If desired, to protect the sides of the work-piece during this operation, a split-sleeve 263 (Fig. 12) may be interposed between the splines 264 of the work-piece and the split, resilient taper jaws 265 of the work-holder 47. An inner mandrel 266 is tapered to cooperate with jaws 265 in wedging the work-piece; the said mandrel 266 being pinned to holder 47 and the latter having a taper fit in the cupped head 46a (Fig. 10) of spindle 46. A flanged hood 269, with sealing skirt 270 protects the spindle during shaping of the work-piece.

Tapped holes 271 are provided in holder 47 to receive the pulling screws 273 shown in Fig. 6 as threaded into a reaction head 274 bearing against the top annular edge of casting 45. A hold-down bolt 276 passes through the center of spindle 46 and receives a nut 277 at its upper end, and is laterally drilled to receive a retaining pin 278 (Fig. 3).

A scale 281 (Fig. 5) is provided on the threaded base member 283 which is shiftable to adjust the vertical range of travel of the spindle. A fixed pointer 285 facilitates such adjustment, by providing a means of reading the scale.

An annular retainer 288 (Fig. 17) holds lever 215 in position and retainer 289 (Fig. 17) receives screws 290 to hold outer screws 211 in place.

As heretofore noted, each tool holding assembly may be in the form shown in Figs. 19 to 22, inclusive, or in the form shown in Figs. 23 to 26, inclusive. These two forms differ in the following major respects: Whereas in form No. 1 the wedging member 92 is a separate piece, in form No. 2 the wedging member 92 is an integral part of the cover plate 98, and is held in position by vertical screws 393 only, in lieu of the combined vertical and horizontal screws (see Figs. 19 and 33) of form. No. 1. The integral member 92-98 of form No. 2 is so formed (see Fig. 34) as to leave a clearance between said member and cross-head 86, to assure tighter wedging engagement of the wedging surfaces of part 92 against the tool 71 and blank 71a (see Fig. 26).

Again, the cross-head 86 of form No. 1 (see Figs. 21 and 35) differs somewhat in shape from the cross-head 86 of form No. 2 (see Figs. 26 and 36) and these differences call for employment of different channeling supports. Thus the channeling supports 401 and 402 of form No. 1 are replaced in form No. 2 by channeling pieces 411, 412, 413 and 414, the former fitting into slots 416 and 417, respectively, and the latter having over-hanging cornices to engage and confine the upper surfaces 421 and 422 of the cross-head 86. Surfaces 421 and 422 in form No. 1 (see Fig. 35), on the other hand, are on a level with the upper surface of bed-plate 91, therefore the rectangular blocks 401 and 402 are all that is required for proper cross-head confinement; in this form.

In each form there are hold-down screws, of course, to secure the cross-head confining pieces to the bed-plate.

What is claimed is:

1. In a machine for shaping clutch teeth, the combination with a spindle aligned with the work to be shaped, of a series of radially disposed cross-heads, each carrying a shaping cutter movable radially of the axis of said spindle to shape a tooth of the clutch simultaneously with the shaping of the other clutch teeth by operation of the associated cutters, means acting through said spindle to index the work, and means for effecting such radial movements of the cutters in synchronism with said indexing of the work.

2. In a machine for shaping clutch teeth, the combination with a spindle aligned with the work to be shaped, of a series of radially disposed cross-heads, each carrying a shaping cutter movable radially of the axis of said spindle to shape a tooth of the clutch simultaneously with the shaping of the other clutch teeth by operation of the associated cutters, means acting through said spindle to index the work, means for effecting such radial movements of the cutters in synchronism with said indexing of the work, and means for reverse-indexing the work, to relieve the condition of contact during the back strokes of the cutters.

3. The method of shaping the teeth of a helically toothed clutch jaw comprising the steps of cutting the said teeth simultaneously in radial directions and while the jaw is held immovable, indexing the jaw by moving it both rotatably and axially, and then repeating the cycle of the enumerated steps of cutting and indexing.

4. The method of shaping a helically toothed clutch jaw comprising the steps of cutting all of the teeth simultaneously in radial directions, retracting said jaw to permit withdrawal of the cutting elements, indexing the jaw by moving it both rotatably and axially in a direction opposite to that of the retracting movement, and then repeating the cycle of the enumerated steps of cutting, retracting and indexing.

EDWARD D. BOYCE.